(12) United States Patent
Akuta

(10) Patent No.: US 9,403,306 B2
(45) Date of Patent: Aug. 2, 2016

(54) INSULATING PLATE, INSULATING PLATE MANUFACTURING METHOD AND TERMINAL BLOCK

(71) Applicant: Sumitomo Wiring Systems, Ltd., Yokkaichi-city (JP)

(72) Inventor: Daisuke Akuta, Yokkaichi (JP)

(73) Assignee: SUMITOMO WIRING SYSTEMS, LTD. (JP)

( * ) Notice: Subject to any disclaimer, the term of this patent is extended or adjusted under 35 U.S.C. 154(b) by 319 days.

(21) Appl. No.: 13/936,511

(22) Filed: Jul. 8, 2013

(65) Prior Publication Data

US 2013/0292876 A1    Nov. 7, 2013

Related U.S. Application Data

(62) Division of application No. 13/293,256, filed on Nov. 10, 2011, now Pat. No. 8,702,361.

(30) Foreign Application Priority Data

Jan. 20, 2011   (JP) .................................. 2011-010054

(51) Int. Cl.
| | |
|---|---|
| *B28B 7/10* | (2006.01) |
| *B29C 45/14* | (2006.01) |
| *H01R 4/34* | (2006.01) |
| *H01R 43/18* | (2006.01) |
| *F16B 33/00* | (2006.01) |
| *B29C 45/40* | (2006.01) |
| *C08K 3/00* | (2006.01) |
| *F16B 37/04* | (2006.01) |
| *H01R 9/24* | (2006.01) |

(52) U.S. Cl.
CPC ..... *B29C 45/14639* (2013.01); *B29C 45/14467* (2013.01); *F16B 33/004* (2013.01); *H01R 4/34* (2013.01); *H01R 43/18* (2013.01); *B29C 45/401* (2013.01); *C08K 3/00* (2013.01); *F16B 37/04* (2013.01); *F16B 37/044* (2013.01); *H01R 9/24* (2013.01)

(58) Field of Classification Search
CPC ...................................................... B29C 45/40
USPC ............... 264/334, 336, 453, 478, 645, 297.2
See application file for complete search history.

(56) References Cited

U.S. PATENT DOCUMENTS

| | | |
|---|---|---|
| 2,431,735 A | 12/1947 | Benjamin |
| 4,409,641 A | 10/1983 | Jakob et al. |
| 5,244,193 A | 9/1993 | Hehr |
| 5,310,351 A | 5/1994 | McAdow et al. |

(Continued)

FOREIGN PATENT DOCUMENTS

JP       2008-098007       4/2008

*Primary Examiner* — Stella Yi
(74) *Attorney, Agent, or Firm* — Gerald E. Hespos; Michael J. Porco; Matthew T. Hespos

(57) ABSTRACT

An insulating plate (20) made of synthetic resin for transferring heat transferred from conductors to nuts (10) to a heat sink (40) is provided with nut accommodating recesses (21) for accommodating the nuts (10). Each nut accommodating recess (21) includes a bottom plate (22) to be sandwiched between the nuts (10) and the heat sink (40) and a surrounding wall (23) vertically extending from the bottom plate (22) to surround the side surface of the nut (10). The surrounding walls (23) are provided with first and second pressing surfaces (28, 29) to be pressed by ejector pins (83).

6 Claims, 16 Drawing Sheets

(56) References Cited

U.S. PATENT DOCUMENTS

| | | | |
|---|---|---|---|
| 5,636,954 A | 6/1997 | Henderson et al. | |
| 5,795,117 A | 8/1998 | Onoda | |
| 6,540,462 B1 | 4/2003 | Bretschneider et al. | |
| 2002/0176906 A1* | 11/2002 | Kinugawa et al. | 425/556 |
| 2009/0103997 A1 | 4/2009 | Csik et al. | |

* cited by examiner

INSULATING PLATE, INSULATING PLATE MANUFACTURING METHOD AND TERMINAL BLOCK

CROSS REFERENCE TO RELATED APPLICATION

This application is a divisional of U.S. patent application Ser. No. 13/293,256 filed Nov. 10, 2011.

BACKGROUND OF THE INVENTION

1. Field of the Invention

The invention relates to an insulating plate, an insulating plate manufacturing method and a terminal block.

2. Description of the Related Art

Japanese Unexamined Patent Publication No. 2008-98007 discloses a terminal block for electrically connecting conductors, such as busbars, extending from electrical devices, such as a motor and an inverter. This terminal block electrically connects the conductors by placing the conductors of the respective electrical devices one above another on metal nuts insert molded in a terminal block main body and fastening the conductors by tightening bolts and the nuts.

The electrical devices generally generate high levels of heat and cause the conductors to become hot. Hence, a metal heat sink is arranged below the nuts via an insulating member in the form of a flat plate made of synthetic resin. Heat transferred from the conductors to the nuts is transferred to the heat sink via the insulating member and is radiated from the heat sink in the terminal block.

Attempts have been made to form the insulating member with recesses to accommodate the nuts. More particularly, a mold is provided with mold pins for forming the recesses. However, a resin molded article, such as the insulating member, generally contracts when being separated from the mold, and it is difficult to separate the resin molded article from the mold due to the mold pins fit in the recesses. Thus, the insulating member is separated from the mold by ejector pins that push the bottom surfaces of the recesses. However, the ejector pins leave slight indents on the bottom surfaces of the recesses. The indents caused by the ejector pins result in air layers between the lower surfaces of the nuts and the bottom surfaces of the recesses. These air layers have lower thermal conductivity than metals, synthetic resins and the like. As a result, heat is not transferred as efficiently from the nuts to the heat sink, thereby reducing heat radiation performance. This phenomenon also could occur on a boundary surface between the insulating member and the heat sink.

The present invention was completed in view of the above situation and an object thereof is to improve heat radiation performance of a terminal block.

SUMMARY OF THE INVENTION

The invention relates to an insulating plate made of synthetic resin for transferring heat from at least one conductor extending from a device to at least one nut and further to a heat sink. The insulating plate has at least one nut accommodating recess for accommodating the respective nut. The nut accommodating recess includes a base plate to be sandwiched in close contact between the nut and the heat sink and at least one surrounding wall extending from the bottom plate to at least partly surround the side surface of the nut. The surrounding wall has at least one pressing portion to be pressed by at least one ejector pin used to separate the nut accommodating recess from a mold pin when the inner surface of the nut accommodating recess is formed.

According to the thus constructed, the pressing portion that is pressed by the ejector pin is on the surrounding wall and not on the bottom plate that is to be held in close contact with the nut. Thus, the nut accommodating recess can be separated from the mold pin without forming an indent on the bottom plate. As a result, an air layer with low thermal conductivity is not formed between the nut and the base plate. In this way, the nut closely contacts the base plate, so that heat can escape more easily from the nut to the heat sink via the insulating plate and heat radiation performance of the terminal block can be improved.

A plurality of pressing portions may be formed intermittently on the surrounding wall. Accordingly, a pressing force of the ejector pin is distributed among the pressing portions when the nut accommodating recess is separated from the mold pin. This can prevent deformation of the insulating plate when the insulating plate is separated from the mold.

The pressing portion may be on an end portion of the surrounding wall opposite to the bottom plate. Accordingly, a separate pressing portion is not needed on the surrounding wall. Therefore, the insulating plate is small and has a simple structure.

Positioning ribs may be provided on the inner surface of the surrounding wall and may extend in a direction away from the bottom plate. The positioning ribs are dimensioned to contact the side surfaces of the nut.

The positioning ribs may be formed to reinforce the surrounding wall over substantially the entire height.

The inner peripheral shape of the surrounding wall may substantially conform to the outer peripheral shape of the nut.

A plurality of nuts may be accommodated in a nut accommodating recess; and at least one partition wall may be provided between the nuts so that the nuts.

The partition wall may extend higher than the conductors placed on the nuts. More particularly, a height of the partition wall may be more than about 1.5 times the height of outer surrounding walls standing up from the bottom plate of the nut accommodating recess.

The heat sink may be positioned with respect to a mold by inserting a positioning projection of the mold into a recess formed in the heat sink.

The synthetic resin used for molding the insulating plate may have a content of glass and talc of between about 50% and about 75%.

The invention also relates to a terminal block with an integrally formed molded resin part that holds insulating plate, the nut and the heat sink in close contact. Thus, a heat radiation performance of the terminal block can be improved.

The present invention is preferably embodied to have the following constructions.

The nut may be disposed in the nut accommodating recess when molding the molded resin part to position the nut with respect to the insulating plate.

These and other objects, features and advantages of the invention will become more apparent upon reading the following detailed description of preferred embodiments and accompanying drawings.

DETAILED DESCRIPTION OF THE PREFERRED EMBODIMENTS

A terminal block in accordance with the invention is to be mounted in a motor case to be installed in a vehicle such as an electric vehicle or a hybrid vehicle and is provided to electrically connect a busbar of a first electric equipment such as an electric motor (e.g. a three-pole busbar provided in a three-phase alternating current motor) and a busbar of a second electric equipment such as an inverter (e.g. a three-pole busbar provided in an inverter).

Figure 2:
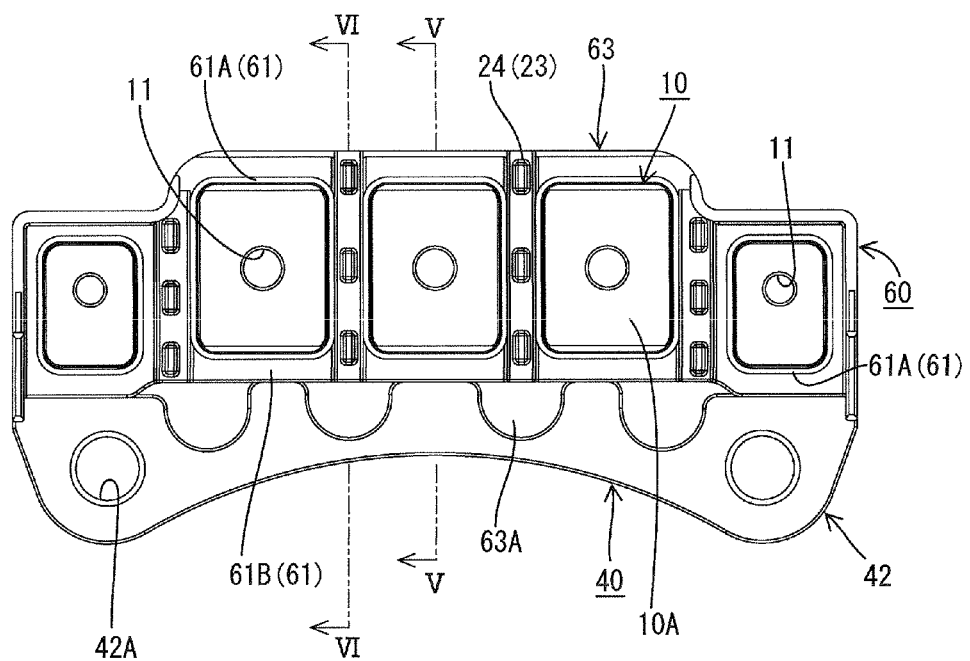
FIG. 2 is a plan view of the terminal block.

The terminal block includes nuts 10 with upper and lower surfaces. Unillustrated busbars extending from electrical devices are to be placed on the upper surfaces of the nuts 10 and a heat sink 40 is arranged adjacent to the lower surfaces of the nuts 10. An insulating plate 20 is sandwiched between the nuts 10 and the heat sink 40. A molded resin part 60 made e.g. of synthetic resin at least partly covers the nuts 10, the insulating plate 20 and the heat sink 40. In the following description, a vertical direction is based on a vertical direction in FIG. 5 and a lateral direction is based on a lateral direction in FIG. 2.

Figure 7:
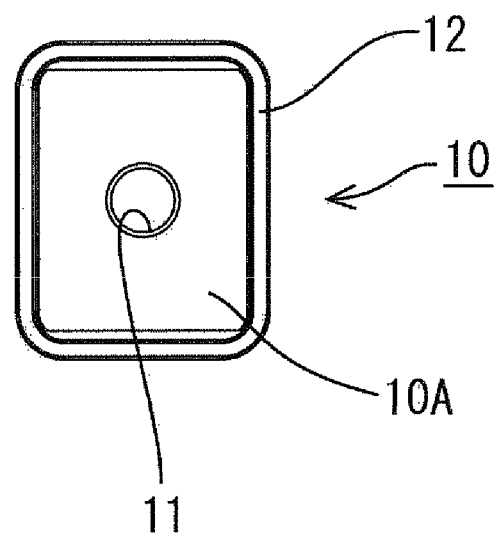
FIG. 7 is a plan view of a nut.
Figure 13:
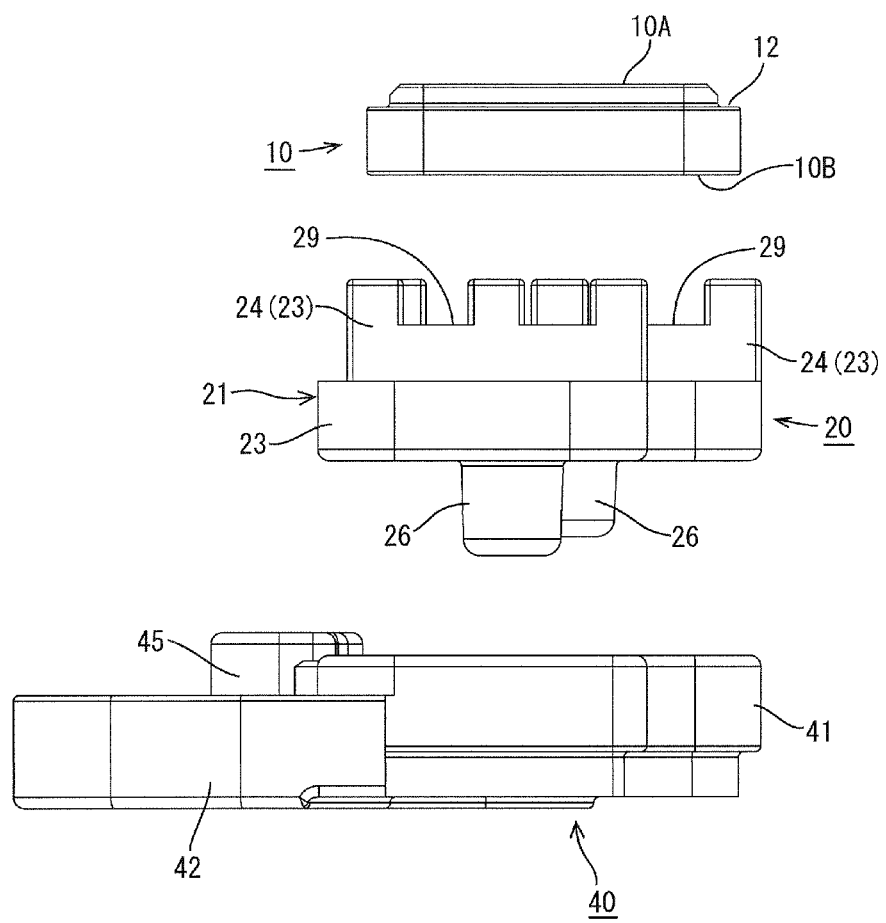
FIG. 13 is a side view showing a state before the nuts, the insulating plate and the heat sink are assembled.

Each nut 10 is a substantially rectangular metal block with rounded corners, as shown in FIGS. 7 and 13, and has upper and lower fastening surfaces 10A and 10B. A bolt tightening hole 11 penetrates a central part of each nut 10 in a vertical direction that is perpendicular to both fastening surfaces 10A, 10B. Unillustrated busbars are placed on the upper fastening surface 10A of the nut 10 and an unillustrated bolt then is screwed into the bolt tightening hole 11 for electrically conductively connecting the busbars.

Figure 5:
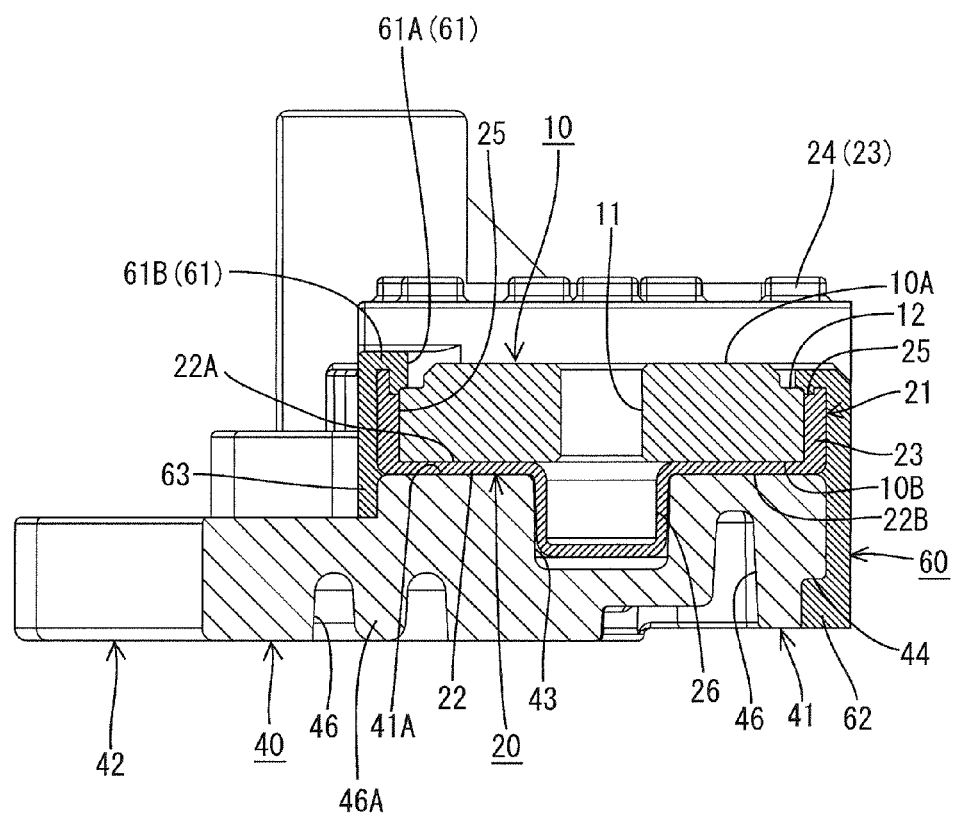
FIG. 5 is a section along V-V of FIG. 2.

A step 12 is formed on the outer peripheral edge of an upper end of the nut 10. This step 12 is formed to be slightly lower than the upper fastening surface 10A of the nut 10, as shown in FIG. 5. The step 12 is provided over substantially the entire outer peripheral edge of the nut 10 and is parallel to the upper and lower fastening surfaces 10A, 10B of the nut 10. Note that the upper and lower fastening surfaces 10A, 10B and the step 12 of the nut 10 are flat without irregularity.

Figure 8:
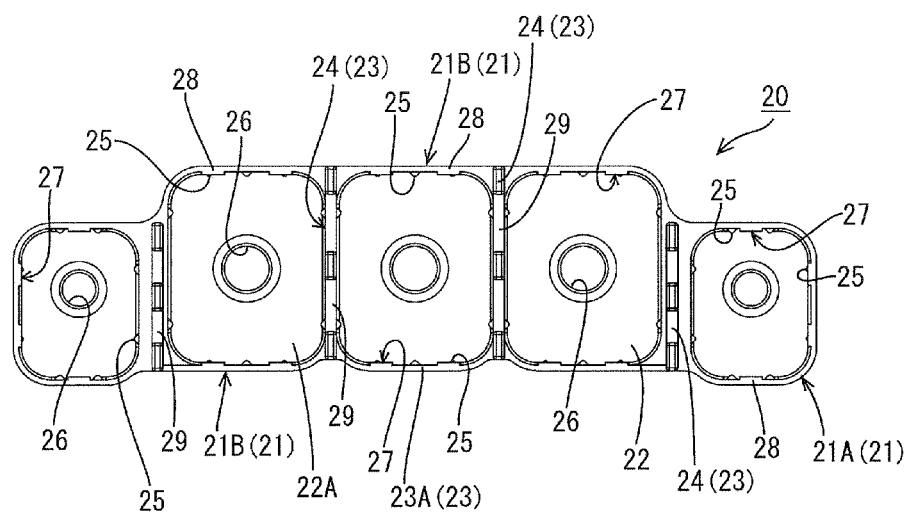
FIG. 8 is a plan view of an insulating plate.

The insulating plate 20 is made of an insulating material such, as synthetic resin, and, is long in the lateral direction, as shown in FIG. 8. The insulating plate 20 functions to transfer heat of the busbars placed on the nuts 10 from the nuts 10 to the heat sink 40 located below the nuts 10. Note that the synthetic resin preferably has a content of glass and talc of between about 50% and 75% (e.g. about 66%). Thus, warping is less likely to occur after molding and thermal conductivity is high as compared to synthetic resin having a content of glass and talc of about 33%. This enables heat to be transferred efficiently from the nuts 10 to the heat sink 40.

Nut accommodating portions 21 are arranged substantially side by side in the lateral direction of the insulating plate 20 and are capable of accommodating the respective nuts 10. The nut accommodating portions 21 function as first positioning means for accommodating the nuts 10.

As shown in FIG. 5, each nut accommodating portion 21 includes a bottom plate 22 for closely contacting the lower fastening surface 10B of the nut 10 and a surrounding wall 23 that projects up from the bottom plate 22 to surround side surfaces of the nut 10 over substantially the entire periphery. Accordingly, the nut accommodating portion 21 has an open upper end with a rectangular shape having rounded corners. Further, as shown in FIG. 8, the respective nut accommodating portions 21 are formed substantially side by side so that longer sides are adjacent to each other. The nut accommodating portions 21 located at the opposite sides in the lateral direction are smaller nut accommodating portions 21A and larger nut accommodating portions 21B are located in a central or intermediate part.

Figure 10:
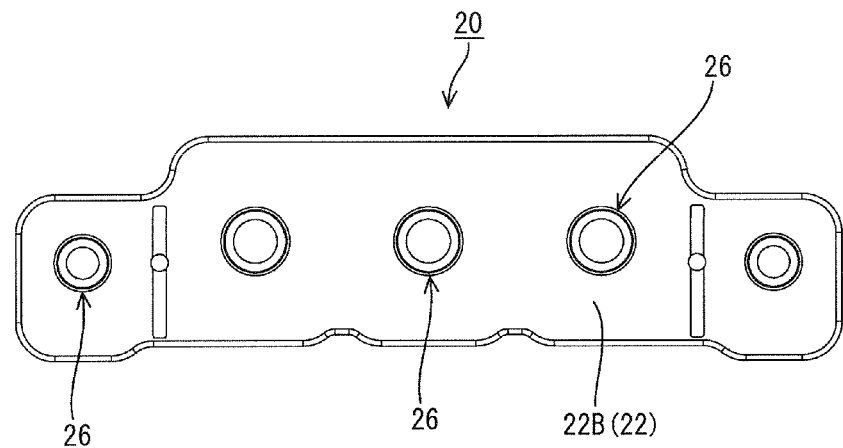
FIG. 10 is a bottom view of the insulating plate.

A single unitary bottom plate 22 is provided for all of the nut accommodating portions 21, as shown in FIG. 10, and has flat upper and lower surfaces 22A, 22B. Thus, the upper surface 22A of the bottom plate 22 can close contact the lower fastening surfaces 10B of the nuts 10 in the nut accommodating portions 21, as shown in FIG. 5, without any clearances between the nuts 10 and the bottom plate 22. In this way, heat can be transferred efficiently from the nuts 10 to the bottom plate 22.

Figure 14:
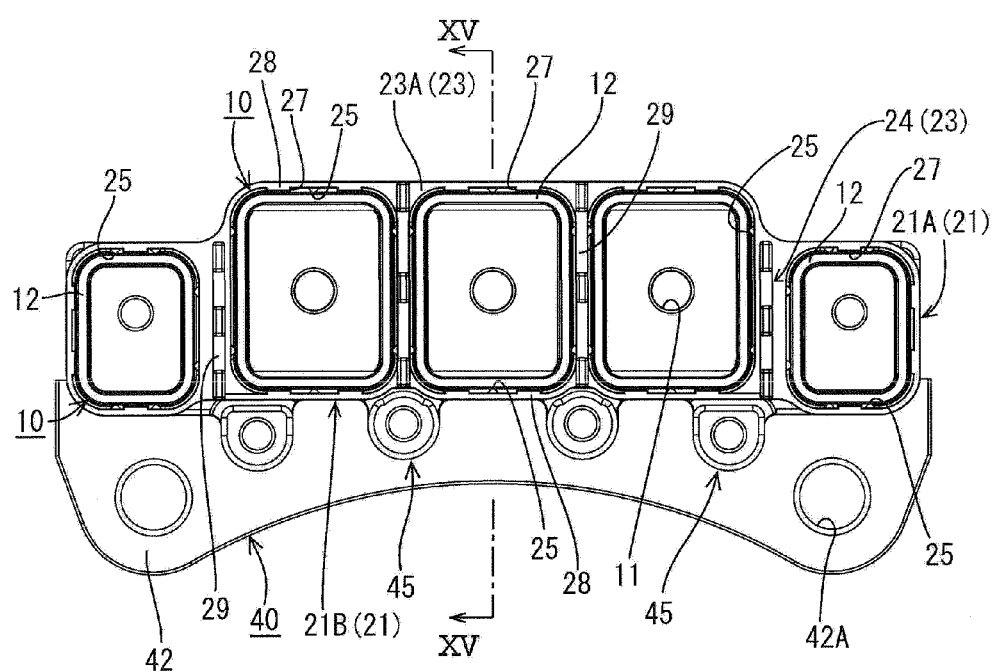
FIG. 14 is a plan view showing a state after the nuts, the insulating plate and the heat sink are assembled.

As shown in FIG. 8, the inner peripheral surfaces of the surrounding walls 23 are substantially rectangular and substantially conform to the outer peripheral shapes of the nuts 10. Further, the inner peripheral surfaces of the surrounding walls 23 are slightly larger than the outer peripheral surfaces of the nuts 10, so that small clearances exist between the inner peripheral surfaces of the surrounding walls 23 and the side surfaces of the nut 10 when the nuts 10 are accommodated in the nut accommodating portions 21 as shown in FIG. 14.

Figure 9:
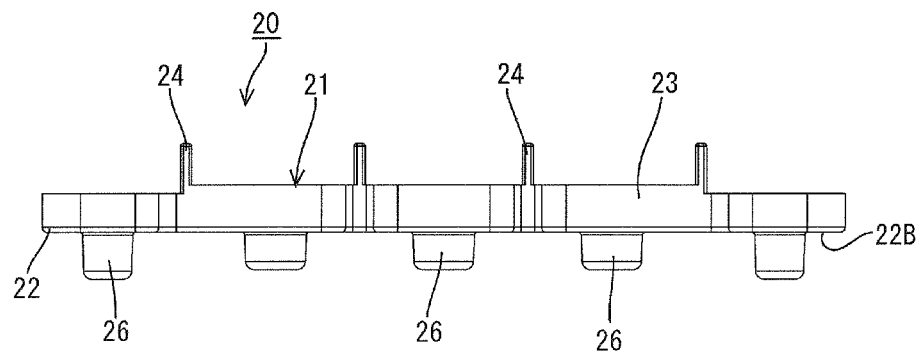
FIG. 9 is a rear view of the insulating plate.

The surrounding wall 23 located between two adjacent nut accommodating portions 21 is common to both nut accommodating portions 21 and defines a partition wall 24 partitioning the two nuts 10 in the nut accommodating portions 21. A part of the surrounding wall other than the partition wall 24 defines an outer surrounding wall 23A. As shown in FIG. 9, the height of the partition wall 24 is about twice the height of the outer surrounding walls 23A to ensure a creepage distance between the two adjacent nuts 10. The partition walls 24 are higher than the busbars placed on the upper fastening surfaces 10A of the nuts 10. Thus, the busbars cannot contact each other to be short-circuited due to lateral movements of the busbars placed on the nuts 10.

Pressing projections 27 project from the respective inner peripheral surfaces of the outer surrounding walls 23A, as shown in FIG. 8, and have a substantially having a rectangular or polygonal plan view. More particularly, one pressing projection 27 is provided on the inner peripheral surface of each shorter side of the surrounding wall 23 of the each smaller nut accommodating recess 21A and two spaced apart pressing projections 27 are provided on the inner peripheral surface of the outer longer side of the surrounding wall 23 of the each smaller nut accommodating recess 21A and the inner peripheral surface of the each shorter side of the surrounding wall 23 of each larger nut accommodating recess 21B.

Figure 17:
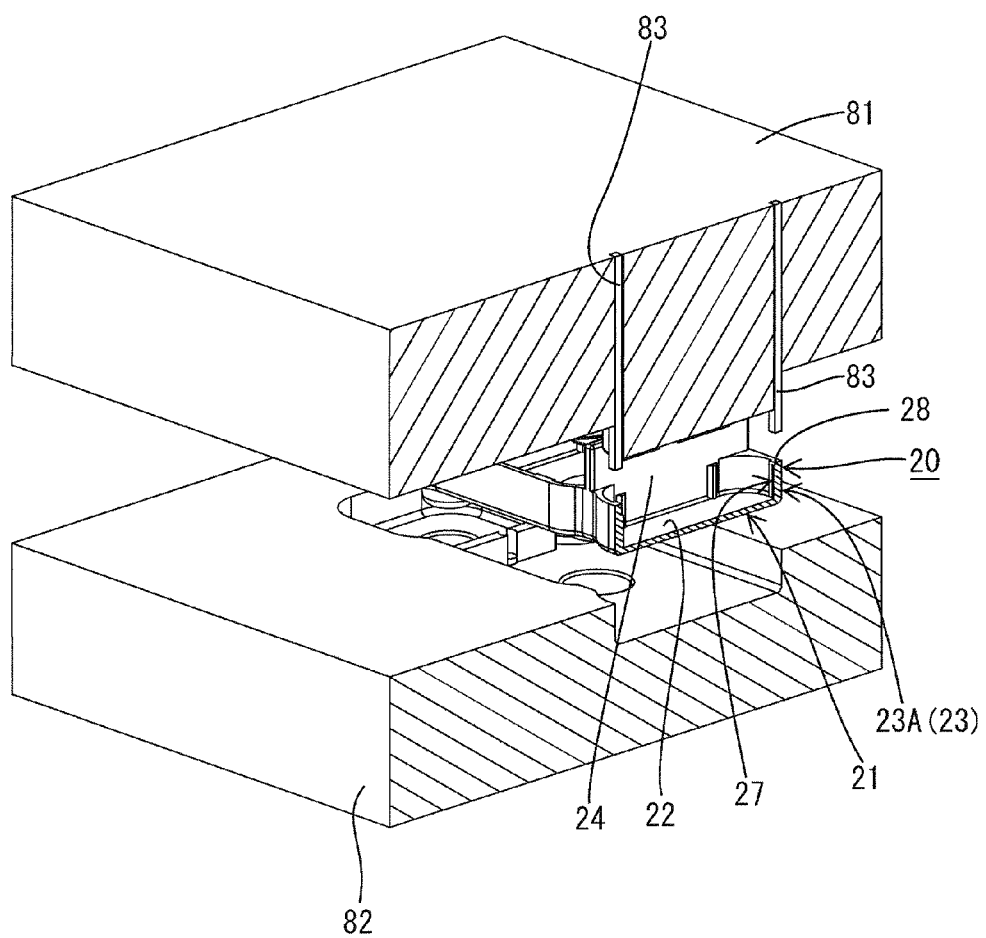
FIG. 17 is a perspective view with a section showing the insulating plate is separated from first and second molds.

The pressing projections 27 extend substantially vertically and are formed over substantially the entire height of the outer surrounding walls 23A. Thus, the upper end surfaces of the pressing projections 27 are substantially flush with the upper end surfaces of the outer surrounding walls 23A as shown in FIG. 17. Further, the thickness of parts where the pressing projections 27 are provided is larger than the thicknesses of the other parts of the outer surrounding walls 23A by the thickness of the pressing projections 27.

First pressing surfaces 28 are formed by the upper end of each pressing projection 27 and the upper end of the outer surrounding wall 23A. The first pressing surfaces 28 formed by the upper end of each pressing projection 27 are substantially flush with and adjacent to the upper end of the outer surrounding wall 23A. The first pressing surfaces 28 formed by the upper end surfaces of the surrounding wall 23 and the pressing projection 27 have substantially the same area.

Figure 6:
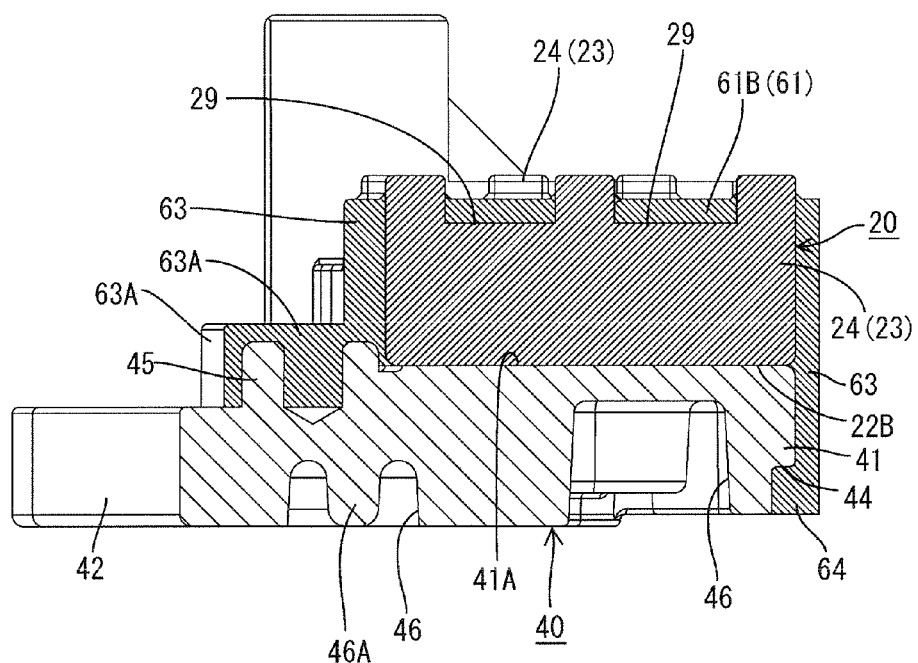
FIG. 6 is a section along VI-VI of FIG. 2.

As shown in FIG. 8, second pressing surfaces 29 are formed on the upper ends of the partition walls 24 and have a rectangular plan view. As shown in FIGS. 6 and 13, the second pressing surfaces 29 are formed by recessing the partition walls 24 at opposite sides of a center of an upper end of each partition wall 24 in a long side direction.

Figure 18:
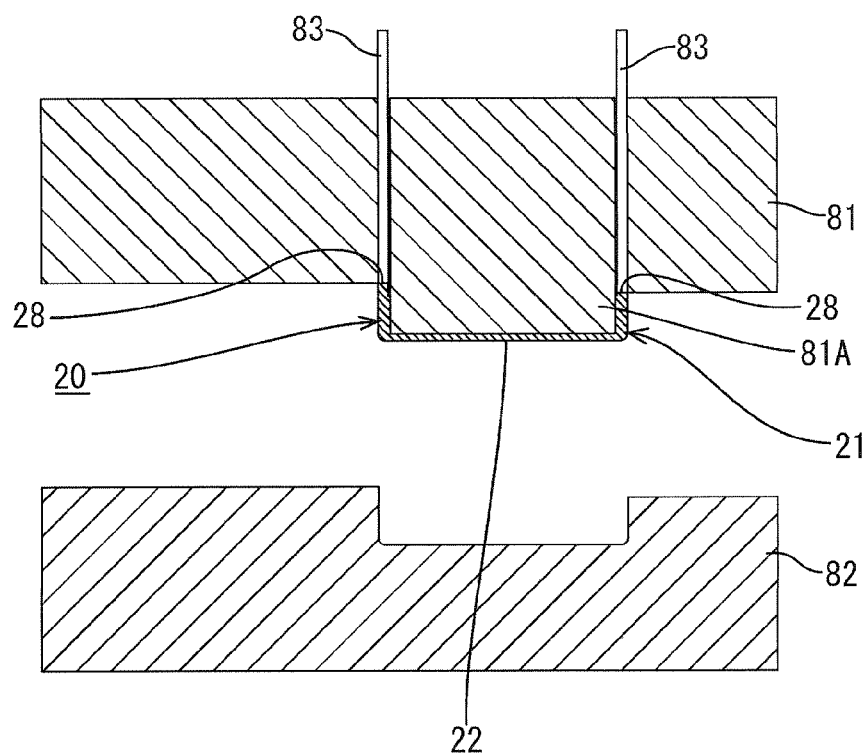
FIG. 18 is a section showing nut accommodating recesses are fitted to the first mold.

Further, as shown in FIGS. 17 and 18, the first and second pressing surfaces 28, 29 are to be pressed by ejector pins 83 provided in molds 81, 82 when the insulating plate 20 is separated from the molds 81, 82 after molding opening. Specifically, the insulating plate 20 is formed by the first mold 81 arranged at an upper side and the second mold 82 arranged at a lower side. The first mold 81 forms a first an upper surface of the insulating plate 20 and the second mold 82 forms a lower surface of the insulating plate 20. The insulating plate 20 is formed by injecting synthetic resin into a cavity formed by the first and second molds 81, 82, and is completed by being separated from the first and second molds 81, 82 after the synthetic resin is cured.

Figure 19:
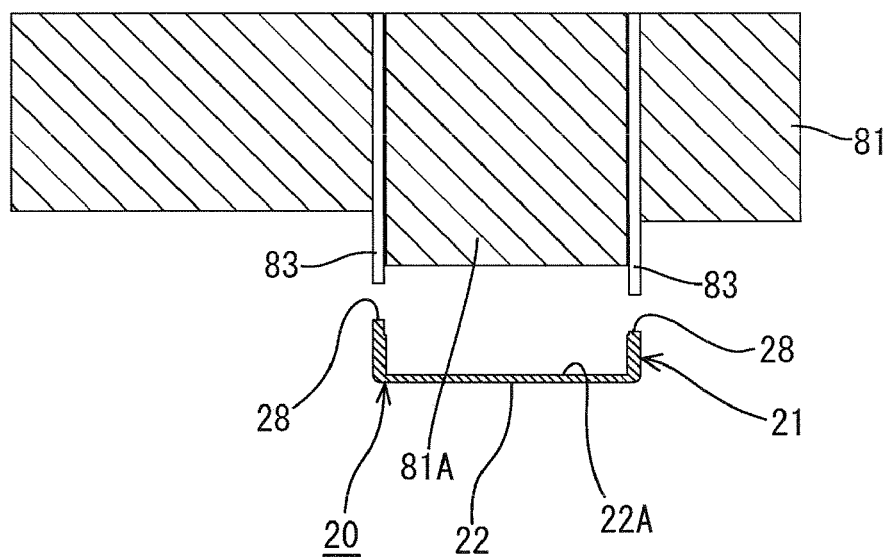
FIG. 19 is a section showing the insulating plate separated from the first mold.

The nut accommodating recesses 21 of the insulating plate 20 are formed by accommodating-portion forming parts, such as mold pin 81A provided in the first mold 81. The nut accommodating recesses 21 slightly contract when cooled and cured and fit to the accommodating-portion forming parts 81A, as shown in FIG. 18. Therefore, it is difficult to separate the nut accommodating recesses 21 from the mold. The ejector pins 83 in the first mold 81 address this problem and press the first and second pressing surfaces 28, 29 so that the nut accommodating recesses 21 are separated from the accommodating-portion forming parts 81A and the insulating plate 20 is separated from the first mold 81 as shown in FIGS. 17 and 19. More particularly, the insulating plate 20 is separated from the first mold 81 by pressing the first and second pressing surfaces 28, 29 instead of the bottom plate 22, and is formed without leaving indents on the surface of the bottom plate 22. As a result, there will be no air layers having lower thermal conductivity than metals, synthetic resins and the like between the nuts 10 and the bottom plates 22. The insulating plate 20 is held in close contact with the nuts 10 and the bottom plate 22 to improve heat transfer from the nuts 10 to the insulating plate 20.

Several first and second pressing surfaces 28, 29 are formed intermittently on the surrounding wall 23. Thus, forces of the ejector pins 83 are distributed among the plurality of first and second pressing surfaces 28, 29 so that the base plate 22 of the insulating plate 20 is prevented from being deformed when the insulating plate 20 is separated from the first mold 81.

The first and second pressing surfaces 28, 29 are formed on respective parts of the upper end surfaces of the surrounding walls 23 and those of the partition walls 24. Thus, it is not necessary to form pressing surfaces separately on the insulating plate 20 and it is possible to make the insulating plate 20 smaller and simple.

Furthermore, the synthetic resin used for the insulating plate 20 has a content of glass and talc of between about 50% and about 75% (e.g. about 66%). Therefore, warping is less likely to occur after molding as compared to synthetic resin having a content of glass and talc of about 33%. This enables the bottom plate 22 of the insulating plate 20 to be held more closely in contact with the nuts 20, and heat transfer from the nuts 10 to the bottom plate 22 is improved further.

Positioning ribs 25 are provided on the inner peripheral surface of the surrounding wall 23 and project in to the nut accommodating portion 21 so that projecting ends of the positioning ribs 25 can contact the side surfaces of the nut 10 accommodated in the nut accommodating portion 21. The positioning ribs 25 of the outer surrounding wall 23A extend substantially straight up from the bottom plate 22 and continue over substantially the entire height of the outer surrounding wall 23A. The positioning ribs 25 on the partition wall 24 extend substantially straight up from the bottom plate 22 to a substantially vertical central of the partition wall 24.

As shown in FIG. 8, two spaced apart positioning ribs 25 are provided on the inner surface at each of four sides of the surrounding wall 23 in each smaller nut accommodating recess 21A. Further, two spaced apart positioning ribs 25 are provided on the inner surface of each longer side of the surrounding wall 23 in each larger nut accommodating recess 21B and three spaced apart positioning ribs 25 are provided on the inner surface of each shorter side thereof. The positioning ribs 25 on the outer longer sides of the surrounding walls 23 in the smaller nut accommodating recesses 21A are formed laterally of the pressing projections 27 and those on the shorter sides of the surrounding walls 23 in the smaller nut accommodating recesses 21A are formed on the pressing projections 27. Further, two of the positioning ribs 25 on each shorter side of the surrounding wall 23 in each larger nut accommodating recess 21B are laterally of side surfaces of the pressing projections 27. In this way, the nuts 10 accommodated in the nut accommodating recesses 21 are positioned accurately by a plurality of positioning ribs 25 as shown in FIG. 14.

A substantially cylindrical bolt escaping recess 26 extends down into a substantially central part of the upper surface 22A of the bottom plate 22 in each nut accommodating portion 21, as shown in FIGS. 5 and 8-10. Each bolt escaping recess 26 has a cylindrical side wall and a bottom wall that have thicknesses substantially equal to the thickness of the bottom plate 22. As shown in FIGS. 9 and 10, each bolt escaping recess 26 has a substantially has a cylindrical outer surface projecting down from the lower surface 22B of the bottom plate 22.

As shown in FIG. 5, the bolt escaping recesses 26 are substantially coaxial with the respective bolt tightening holes 11 of the nuts 10 and have inner diameters slightly larger than the bolt tightening holes 11. Thus, the nut 10 will not interfere with the bottom plate 22 of the insulating plate 20 and the insulating plate 20 will not be broken by the bolt as the bolt is screwed into the nut 10 and inserted through the bolt tightening hole 11.

Figure 11:
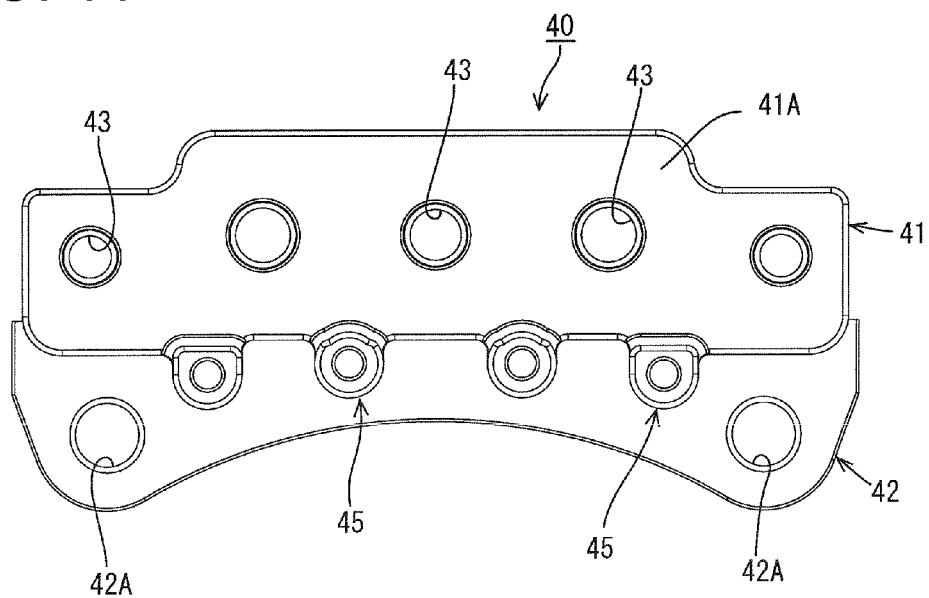
FIG. 11 is a plan view of a heat sink.

The heat sink 40 is shown in FIG. 11 and is produced of a material having a higher heat capacity than the remaining parts of the terminal block, such as die-cast aluminum. The heat sink 40 includes a sink main body 41 on which the insulating plate 20 is to be placed, and a fixing portion 42 unitary with the sink main body 41. The sink main body 41 is laterally long and the fixing portion 42 projects from one longer side edge of the sink main body 41.

The insulating plate 20 is to be placed on an upper surface 41A of the sink main body 41. Further, the upper surface 41A of the sink main body 41 is flat and/or polished to have no irregularities. This enables the lower surface 22B of the bottom plate 22 of the insulating plate 20 and the upper surface 41A of the sink main body 41 to be held in close contact with the insulating plate 20 placed on the upper surface 41A of the sink main body 41 as shown in FIG. 5.

The sink main body 41 is formed with five accommodation recesses 43 arranged at substantially equal intervals in the lateral direction. The accommodation recesses 43 define substantially circular openings in the upper surface 41A of the sink main body 41 and are bottomed recesses that extend down into the upper surface 41A of the sink main body 41, as shown in FIG. 5. The accommodation recesses 43 are formed so that the bolt escaping recesses 26 of the insulating plate 20 can nest therein. More particularly, the bolt escaping recesses 26 are fit in the accommodation recesses 43 with small clearances between the outer surfaces of the bolt escaping recesses 26 and the inner peripheral surfaces of the accommodation recesses 43. Thus, the insulating plate 20 and the heat sink 40 can be assembled and positioned with respect to each other by fitting the bolt escaping recesses 26 of the insulating plate 20 into the corresponding accommodation recesses 43.

Figure 12:
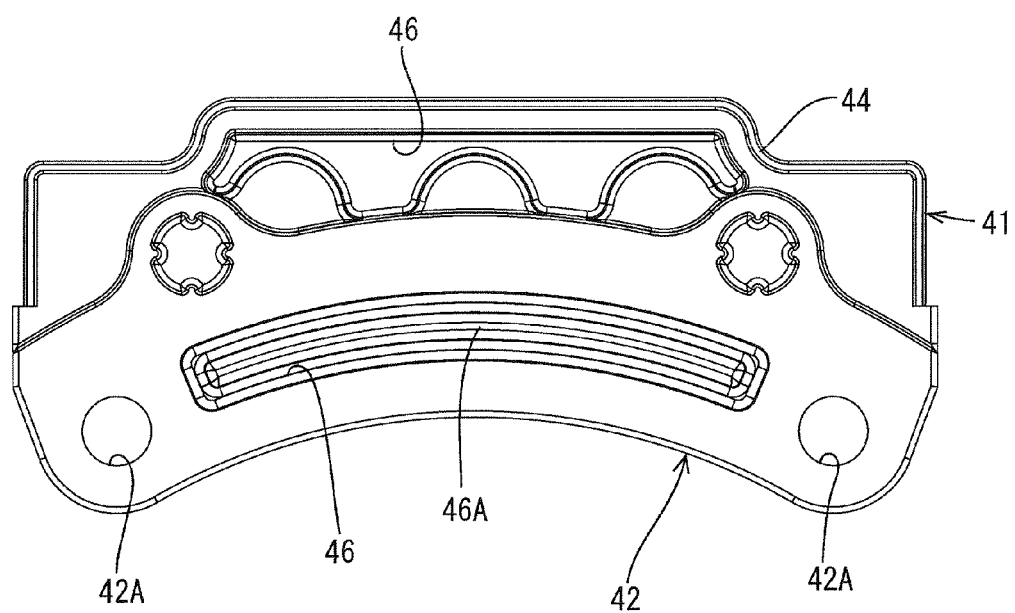
FIG. 12 is a bottom view of the heat sink.

An outer edge step 44 is formed at the outer peripheral edge of a lower end of the sink main body 41 and is above the lower surface of the sink main body 41. As shown in FIG. 12, this outer edge step 44 is formed over all of the outer peripheral edge except at a connected part of the sink main body 41 to the fixing portion 42.

The fixing portion 42 is laterally long along the side surface of the sink main body 41. Bolt insertion holes 42A vertically penetrate opposite lateral sides of the fixing portion 42. Substantially cylindrical projections 45 extend vertically from the upper surface of the fixing portion 42. As shown in FIG. 6, the cylindrical projections 45 are connected to the side surface of the sink main body 41 facing the fixing portion 42, and extend up to a position slightly above the upper surface 41A of the sink main body 41. Each cylindrical projection 45 defines a bottomed recess with an open upper end, as shown in FIG. 11.

As shown in FIG. 12, recesses 46 are formed in the lower surfaces of the sink main body 41 and/or the fixing portion 42. The recesses 46 form at least one heat radiation fin 46A in the fixing portion 42, and cooling water or fluid may be circulated to contact the fin 46A. The recess 46 and the heat radiation fin 46A increase the surface area of the lower surface of the heat sink 40 and thus improve a heat radiation property from the heat sink 40.

Figure 1:
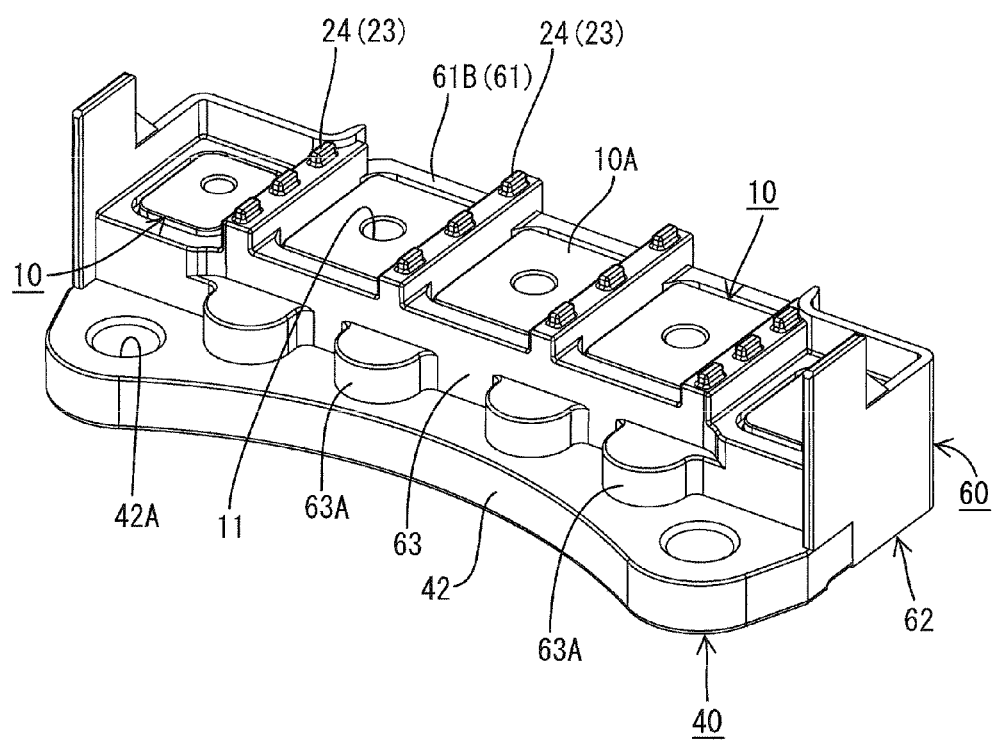
FIG. 1 is a perspective view of a terminal block.
Figure 3:
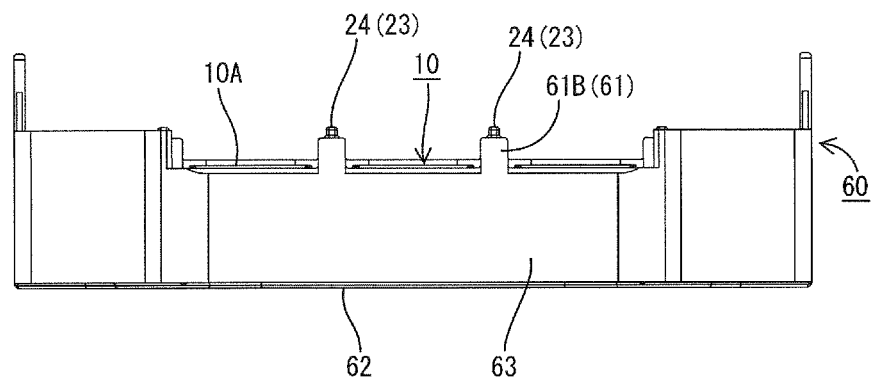
FIG. 3 is a rear view of the terminal block.

The molded resin part 60 is made unitarily e.g. of synthetic resin and, as shown in FIGS. 1, 3 and 5, partly covers the nuts 10, the insulating plate 20 and the heat sink 40 that have been assembled with each other. The molded resin part 60 includes an upper cover 61 that closely contacts the steps 12 of the nuts 10 and the upper ends of the surrounding walls 23 of the insulating plate 20, a lower cover 62 that closely contacts the outer edge step 44 of the heat sink 40, and a side wall 63 that closely contacts the insulating plate 20 and the outer side surfaces of the sink main body 41 of the heat sink 40. Thus, the side wall 63 unitarily joins the upper and lower covers 61, 62.

As shown in FIG. 5, the upper cover 61 includes nut covers 61A that cover the outer peripheral edges of the steps 12 of the respective nuts 10 over substantially the entire peripheries and surrounding wall covers 61B that cover the upper ends of the surrounding walls 23 except at parts of the partition walls 24. The nut covers 61A and the surrounding wall covers 61B are formed unitarily. Note that the parts of the partition walls 24 are exposed at the upper end surfaces of the surrounding wall covers 61B.

Figure 4:
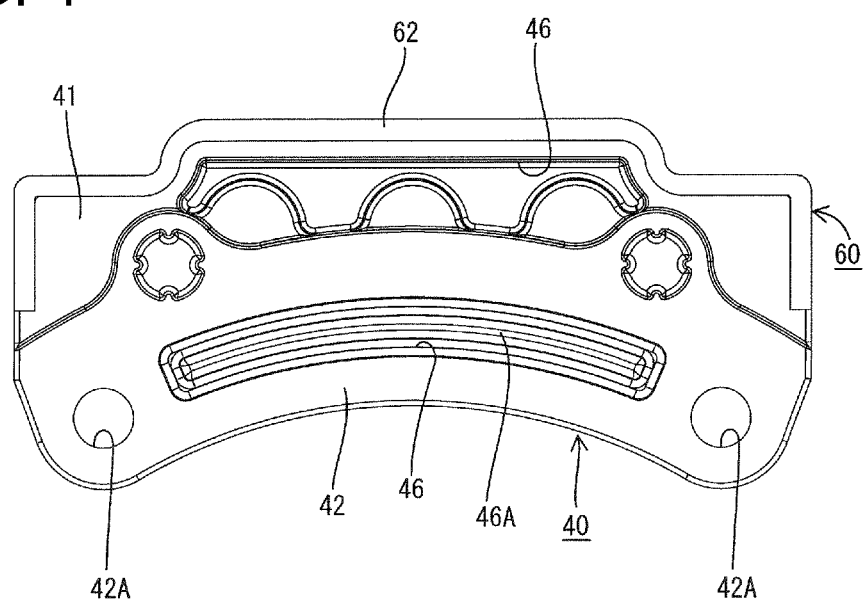
FIG. 4 is a bottom view of the terminal block.

As shown in FIGS. 4 and 5, the lower cover 62 covers the outer edge step 44 of the sink main body 41 of the heat sink 40 over the entire range from below. In this way, the molded resin part 60 vertically sandwiches the nuts 10, the insulating plate 20 and the heat sink 40 and hold the respective members 10, 20 and 40 in close contact with each other, as shown in FIGS. 5 and 6.

The upper cover 61 also substantially fills the clearances between the inner peripheral surfaces of the surrounding walls 23 of the nut accommodating portions 21 and the side surfaces of the nuts 10, thereby improving a degree of adhesion between the molded resin part 60, the nuts 10 and the insulating plate 20.

As shown in FIGS. 3 and 5, the side wall 63 entirely covers the side surfaces of the insulating plate 20 and the side surfaces of the sink main body 41 of the heat sink 40 between the upper and lower covers 61 and 62. As shown in FIG. 6, the side wall 63 has projection covers 63A that cover the cylindrical projections 45 of the heat sink 40. The projection covers 63A fill up the interiors of the cylindrical projections 45 and entirely cover the upper and side surfaces of the cylindrical projections 45, thereby improving a degree of adhesion between the molded resin part 60 and the heat sink 40.

Figure 15:
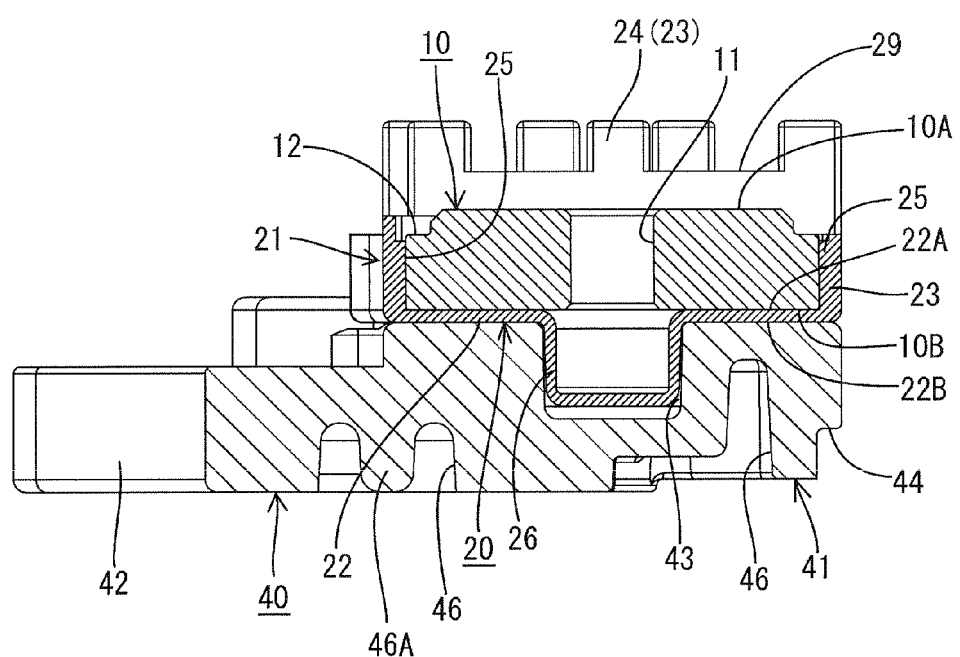
FIG. 15 is a section along XV-XV of FIG. 14.

The terminal block is assembled by initially placing the nuts 10 in the respective nut accommodating portions 21 of the insulating plate 20 and fitting the bolt escaping recesses 26 of the nut accommodating portions 21 into the respective accommodation recesses 43 of the heat sink 40. The nuts 10, the insulating plate 20 and the heat sink 40 that have been assembled, as shown in FIGS. 14 and 15, then are set in first and second molds 71, 72. The properly positioned nuts 10, insulating plate 20 and heat sink 40 can be set in the first and second molds 71, 72 without being displaced. The surfaces of the insulating plate 20 do not have even small irregularities. Thus, the upper and lower surfaces 22A and 22B of the bottom plate 22 closely contact the lower fastening surfaces 10B of the nuts 10 and the upper surface 41A of the sink main body 41 of the heat sink 40.

Further, the steps 12 of the nuts 10 are pressed over the entire peripheries from above by resin engaging portions 73 in the first block mold 71 and the lower surface of the heat sink 40 is supported by the second block mold 72. Thus, the bottom plate 22 of the insulating plate 20 is sandwiched between the lower fastening surfaces 10B of the nuts 10 and the upper surface 41A of the sink main body 41 of the heat sink 40 to hold the nuts 10, the heat sink 40 and the bottom plate 22 in close contact.

Figure 16:
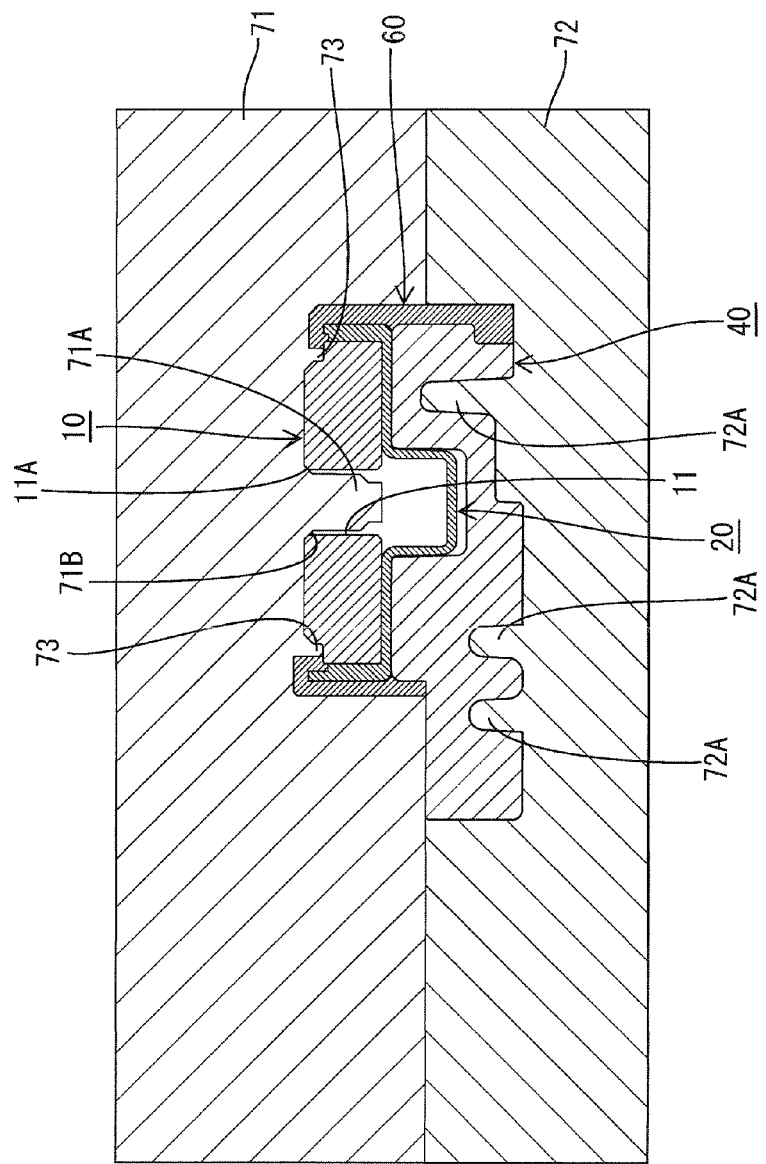
FIG. 16 is a section showing a terminal block molded in first and second block molds.

The properly positioned nuts 10, insulating plate 20 and heat sink 40 are set in the first and second block molds 71, 72 without being displaced. More particularly, the heat sink 40 is positioned with respect to the second block mold 72 by inserting a positioning projection 72A of the second block mold 72 into the recess 46 of the heat sink 40, as shown in FIG. 16. Further, the insulating plate 20 is positioned on the heat sink 40 and the nuts 10 are positioned on the insulating plate 20. Thus, the positioning pins 71A will not displace sufficiently from the bolt tightening holes 11 to break the nuts 10 and/or the positioning pins 71A when the positioning pins 71A of the first block mold 71 are inserted into the bolt tightening holes 11 of the nuts 10. Note that the nuts 10 are accommodated slightly loosely in the nut accommodating recesses 21 before being fixed by the positioning pins 71A. Hence, slight relative displacements of the positioning pins 71A and the bolt tightening holes 11 of the nuts 10 are corrected when the first and second block molds 71, 72 are closed so that the nuts 10 are fixed to the positioning pins 71A by locating taper surfaces 11A provided at the upper inner peripheral edges of the bolt tightening holes 11 of the nuts 10 at inclined surfaces 71B of the positioning pins 71A, as shown in FIG. 16.

Synthetic resin then is injected into a cavity formed by the first and second block molds 71, 72 to form the molded resin part 60 as shown in FIG. 16. At this time, the side surfaces of the nuts 10 are held in contact only with the positioning ribs 25 on the inner peripheral surfaces of the surrounding walls 23 of the insulating plate 20, and the synthetic resin can flow into the clearances between the inner surfaces of the surrounding walls 23 and the side surfaces of the nuts 10. Thus, the nuts 10, the insulating plate 20 and the molded resin 60 are held in close contact. Additionally, the nuts 10 and the insulating plate 20 are held without any chance of backlash.

Finally, the first and second block molds 71, 72 are opened to complete the terminal block.

As described above, the first and second pressing surfaces 28, 29 of the insulating plate 20 are on the surrounding walls 23 rather than on the bottom plate 22. Thus, there are no indents caused by the ejector pins on the surface of the bottom plate 22 that closely contacts the nuts 10. This enables the nuts 10 and the bottom plate 22 to be held in close contact and heat can be transferred efficiently from the nuts 10 to the insulating plate 20. Consequently, heat radiation performance of the terminal block can be improved by efficiently transferring heat from the nuts 10 to the heat sink 40 via the insulating plate 20.

The molded resin 60 is formed with the nuts 10, the insulating plate 20 and the heat sink 40 in close contact. Additionally, the nuts 10, the insulating plate 20 and the heat sink 40 are sandwiched in close contact by the upper and lower covers 61 and 62 of the molded resin 60 to improve heat transfer from the nuts 10 to the heat sink 40.

The terminal block has the unitary matrix of resin 60 holding the nuts 10, the insulating plate 20 and the heat sink 40 at correct positions. Thus, an insulating property between the nuts 10 and the heat sink 40 is ensured reliably.

The invention is not limited to the above described and illustrated embodiment. For example, the following embodiments also are included in the scope of the invention.

The pressing portion is composed of the upper end surfaces of the surrounding walls 23 and the pressing projections 27 in this embodiment. However, the invention is not limited to such a construction. For example, the pressing portion may be composed only of the upper end surfaces of the surrounding walls 23.

The pressing portion is composed of the upper end surfaces of the surrounding walls 23 and the pressing projections 27 and the upper end surfaces of the partition walls 24 in this embodiment. However, the pressing portion may be composed of the bottom surfaces of the bolt escaping recesses 26.

The pressing portion is composed of the upper end surfaces of the surrounding walls 23 and the pressing projections 27 and the upper end surfaces of the partition walls 24 in this embodiment. However, the pressing portion may be composed of projections provided on outer peripheral parts of the nut accommodating recesses 21 and can be pressed by the ejector pins.

What is claimed is:

1. A method for molding an insulating plate, the method comprising:
    providing first and second molds configured to form the insulating plate with a nut accommodating recess having a bottom plate and a surrounding wall extending from the bottom plate;
    injecting molten resin between the first and second molds;
    curing the resin; and
    extending ejection pins from the first mold and against pressing surfaces defined on parts of the surrounding wall facing away from the bottom plate to separate the insulating plate from at least the first mold without creating indents in the bottom plate, wherein the resin of the insulating plate has a content of glass and talc of between about 50% and about 75%.

2. The method of claim 1, wherein the step of extending the ejection pins against the pressing surfaces comprises pressing the ejection pins against a plurality of spaced apart pressing surface.

3. The method of claim 1, further comprising forming positioning ribs projecting in on an inner surface of the surrounding wall and extending substantially away from the bottom plate, the pressing surfaces being aligned with ends of the positioning ribs.

4. A method for manufacturing a terminal block, the method comprising:
    providing first and second molds configured to form an insulating plate with a nut accommodating recess having a bottom plate and a surrounding wall extending from the bottom plate;
    injecting molten resin between the first and second molds;
    curing the resin;
    extending ejection pins from the first mold and against pressing surfaces defined on parts of the surrounding wall facing away from the bottom plate and without having any of the ejection pins contact the bottom plate to separate the insulating plate from at least the first mold without creating indents in the bottom plate; and
    inserting a nut in the nut accommodating recess so that a surface of the nut is in direct face-to-face contact with the bottom plate;
    molding an outer resin part around the surrounding wall of the nut accommodating recess and engaging a peripheral area of the nut opposite the surface of the nut that is in direct face-to-face contact with the bottom plate to hold the surface of the nut in direct face-to-face contact with the bottom plate, whereby an absence of indents in the bottom plate avoids having air between the bottom plate and the nut to enhance heat transfer between the nut and the bottom plate.

5. A method for manufacturing a terminal block, the method comprising:
    providing first and second molds configured to form an insulating plate with a nut accommodating recess having a bottom plate and a surrounding wall extending from the bottom plate;
    injecting molten resin between the first and second molds to form the insulating plate, the resin of the insulating plate having a content of glass and talc of between about 50% and about 75%;
    curing the resin;
    extending ejection pins from the first mold and against pressing surfaces defined on parts of the surrounding wall facing away from the bottom plate and without having any of the ejection pins contact the bottom plate to separate the insulating plate from at least the first mold without creating indents in the bottom plate;

inserting a nut in the nut accommodating recess so that a surface of the nut is in direct face-to-face contact with the bottom plate, whereby an absence of indents in the bottom plate avoids having air between the bottom plate and the nut to enhance heat transfer between the nut and the bottom plate.

6. The method of claim 5, further comprising molding an outer resin part around the surrounding wall of the nut accommodating recess and engaging a peripheral area of the nut opposite the surface of the nut that is in direct face-to-face contact with the bottom plate to hold the surface of the nut in direct face-to-face contact with the bottom plate.

* * * * *